United States Patent [19]

Jain et al.

[11] Patent Number: 5,002,904

[45] Date of Patent: Mar. 26, 1991

[54] PROCESS FOR PRODUCING SHAPED REFRACTORY PRODUCTS

[75] Inventors: Mukesh K. Jain; Sadashiv K. Nadkarni, both of Jonquiere, Canada

[73] Assignee: Alcan International Limited, Montreal, Canada

[21] Appl. No.: 253,150

[22] Filed: Oct. 4, 1988

[30] Foreign Application Priority Data

Oct. 22, 1987 [CA] Canada ................... 549996

[51] Int. Cl.$^5$ .............................................. C04B 35/58
[52] U.S. Cl. ........................................ 501/80; 501/96; 501/98; 423/409; 423/412; 264/29.2; 264/29.4; 264/29.6
[58] Field of Search .............. 501/85, 80, 96, 98, 501/95; 423/406, 409, 412; 204/29.2, 29.3, 29.4, 29.6, 29.7

[56] References Cited

U.S. PATENT DOCUMENTS

| | | | |
|---|---|---|---|
| 4,256,676 | 3/1981 | Kovach | 264/29.4 X |
| 4,615,863 | 10/1986 | Inoue et al. | 501/96 X |
| 4,652,436 | 3/1987 | Kato | 423/412 |
| 4,670,407 | 6/1987 | Kiehl et al. | 501/98 X |
| 4,780,299 | 10/1988 | Kumagai et al. | 423/412 |
| 4,784,839 | 11/1988 | Bachelard et al. | 423/412 X |
| 4,851,205 | 7/1989 | Mitomo | 501/98 X |
| 4,857,246 | 8/1989 | Bolt | 264/29.2 |

FOREIGN PATENT DOCUMENTS 3500422  9/1985  Fed. Rep. of Germany .
54-92629  2/1981  Japan .

*Primary Examiner*—Karl Group
*Attorney, Agent, or Firm*—Cooper & Dunham

[57] ABSTRACT

Shaped refractory products, particularly in the form of hollow spheres, and a process for their formation. The process involves dispersing particles of silica or a metal oxide, e.g. $Al_2O_3$, in an organic polymer, shaping the dispersion into a desired shape, heating the shaped dispersion in a non-oxidizing atmosphere to carbonize the polymer, and heating the carbonized product at high temperature in a non-oxidizing atmosphere containing nitrogen so that some of the oxide is converted to the corresponding nitride and the particles of unreacted oxide sinter together. The ratio of oxide to carbon should be high so that some but not all of the oxide is converted to the nitride and, preferably, only a relatively small amount should be converted. The resulting refractory material is strong and can be used for a variety of uses, e.g. catalyst supports, packing materials and insulating materials.

14 Claims, No Drawings

PROCESS FOR PRODUCING SHAPED REFRACTORY PRODUCTS

BACKGROUND OF THE INVENTION

I. FIELD OF THE INVENTION

This invention relates to shaped refractory products made primarily of silica or refractory metal oxides, e.g. alumina, zirconia, titania, tungsten oxide etc., and more particularly to a process of producing such shaped products.

II. DESCRIPTION OF THE PRIOR ART

Shaped refractory products made primarily of refractory oxides have a variety of uses. For example, they may be used as catalyst supports, packing materials and insulating materials. The products are preferably produced in the form of hollow spheres when used for these purposes. Hollow spheres are generally formed by coating a volatile core with a ceramic powder and then heating the coated cores to cause the ceramic powder to sinter and to cause the core to disappear by volatilization (e.g. as disclosed in Watson et al. U.S. Pat. No. 4,039,480 issued on Aug. 2, 1977). Another method of forming oxide spheres is disclosed in Schmitt U.S. Pat. No. 3,792,136 issued on Feb. 12, 1974. This involves impregnating resinous microspheres with a metallic compound, heating the microspheres slowly to carbonize the resin and igniting the microspheres to remove the carbon and to produce the metal oxide.

These methods are not easy to carry out and tend to be expensive and so an object of the invention is to provide an alternative procedure for forming such products.

SUMMARY OF THE INVENTION

According to the invention there is provided a process for producing shaped refractory products, which comprises: dispersing particles of a refractory oxide selected from silica, metal oxides and mixtures thereof in an organic polymer to form a dispersion, shaping the dispersion into a desired shape, heating the shaped dispersion in a non-oxidizing atmosphere to carbonize the polymer, and heating the carbonized product at a nitride-forming temperature in a non-oxidizing atmosphere containing nitrogen, wherein the ratio of the oxide to the carbon formed from the polymer upon said carbonization is chosen so that some but not all of the oxide is converted to the corresponding nitride.

The invention also relates to the shaped products, particularly hollow spheres, produced by the process mentioned above.

By the term "non-oxidizing atmosphere" we mean one that does not contain any reactants (such as oxygen) that will react preferentially with the carbon at the elevated temperatures employed in the invention and thus hinder the nitride-forming reaction.

DETAILED DESCRIPTION OF THE PREFERRED EMBODIMENTS

Preferably the shapes produced during the shaping step have a maximum thickness of about 5 mm (i.e. no interior part of the product should be more than about 2.5 mm from the closest surface). This permits adequate permeation of the nitrogen into the shaped intermediate product during the final heating step so that all of the oxide which reacts with the carbon is subsequently converted to the nitride.

The process of the present invention is based on the fact that the carbon derived from the organic polymer reacts with a portion of the refractory oxide in the presence of nitrogen to yield the corresponding nitride, e.g. according to the following reaction:

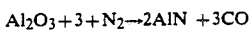

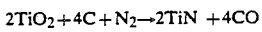

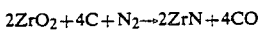

Because the dispersion of the oxide in the polymer is easy to shape into a variety of forms, the process of the invention can be used to form a variety of shaped ceramic products in a simple and inexpensive manner.

The nitride serves to bond together the remaining (unreacted) oxide particles so that a strong composite structure results. At the temperatures employed, sintering of the remaining oxide particles also takes place, thereby further increasing the strength of the product. It seems that the nitride may function as a "sintering aid" by improving the strength of the product that can be obtained during the sintering step compared with the strength of the product obtained by sintering a similar oxide powder containing no nitride.

The ratio of oxide to carbon has no precise upper limit, although the desirable effect of the nitride will be minimized if the ratio is too high and the shape formation-ability will be reduced if there is not enough polymer present. On the other hand, there must be more than the stoichiometrical amount of oxide present, otherwise all the oxide will be converted to nitride, which is not the intention. Preferably the majority of the oxide remains unconverted to the nitride. The preferred oxide to carbon ratios vary from oxide to oxide. In the case of alumina, for example, the ratio $Al_2O_3:C$ may be 1 or more:0.5 by weight. Indeed, the ratio of $Al_2O_3:C$ is desirably made as high as practically possible, e.g. 8-9:0.5.

The process can be operated with silica or any refractory metal oxide which is (a) convertible to the nitride by the reaction indicated above, and (b) sinterable at the reaction temperatures. Suitable examples include silica, tungsten oxide and oxides of metals from Groups 3 and 4 of the Periodic Table, e.g., $Al_2O_3$, $ZrO_2$, $TiO_2$, etc.

The oxides should desirably be in the form of fine particles. The size of the particles is not particularly critical, but particles of about 5$\mu$ or smaller are particularly effective in the invention.

The organic polymer used in the invention may be any one capable of giving a relatively high yield of carbon when heated in a non-oxidizing atmosphere to a suitable temperature, e.g. in the range of 500°-750° C. Suitable polymers include polyacrylonitrile and its copolymers and terpolymers (collectively referred to as PAN), cellulose and its derivatives, polyvinyl alcohol and its copolymers and terpolymers, polyarylether, polyacenaphthylene, polyacetylene, and the like. Other suitable materials are disclosed in "Precursors for Carbon and Graphite Fibers" by Daniel J. O'Neil, Intern. J. Polymeric Meter, Vol. 7 (1979), p 203.

PAN is the most preferred material for use in the present invention. PAN is widely used for textiles, for the production of carbon fibres and for other purposes. For example, it is sold under the trade mark ORLON by E. I. DuPont de Nemours and Company, and the structure of this particular product is disclosed in an article by R. C. Houtz, Textile Research Journal, 1950, p. 786. Textile grade PAN is commonly a copolymer of polyacrylonitrile and up to 25% by weight (more commonly up to 10% by weight and ususally about 6% by weight) of methacrylate or methylmethacrylate. Textile grade PAN copolymers can be used in the present invention and are in fact preferred to PAN homopolymer because the additional units in the copolymer assist in the cyclization of the polymer when heat stabilization is carried out to make the polymer infusible. Inexpensive waste PAN from the textile industry, such as the so-called "dryer fines", are particularly useful in the invention.

PAN has a carbon yield of about 50% by weight so that the amount of polymer employed should be about twice the amount of carbon required in the oxide/carbon intermediate.

PAN may require a heat stabilization treatment prior to the carbonization step in order to make the polymer infusible and thus to avoid cracking or warping when the carbonization step is carried out. The heat stabilization step causes the PAN polymer to cyclize, e.g. as follows:

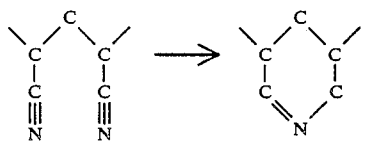

The heat stabilization is carried out by heating the polymer in air or oxygen at a temperature of about 190° to 220° C. for several hours, e.g. up to about 16 hours.

The oxide particles may be dispersed in the organic polymer by any suitable means For example, the polymer may be melted and the oxide particles stirred into it. However, the preferred method of dispersing the oxide into the polymer is by dissolving the polymer in a suitable solvent, adding the oxide particles to the solution and dispersing them by vigorous agitation, and then removing the solvent to form a solid polymer product containing uniformly dispersed oxide particles. The solvent may be removed by evaporation (with heating if the solvent is not very volatile), but the preferred method is so-called "solvent drying" in which the polymer solution is contacted with a liquid which is a non-solvent for the polymer but which is miscible with the polymer solvent. The liquid extracts the solvent from the solution and the solid polymer coagulates or precipitates without changing the distribution of oxide particles to any significant extent.

When the solvent drying technique is employed, shaped polymer/oxide dispersions can be formed in a particularly easy manner. For example, spheres can be produced by dropping droplets of the polymer/oxide solution into a bath of the non-solvent. Elongated thin cylinders (known as "noodles") can be formed by extruding the polymer/oxide solution from an orifice located beneath the surface of the non-solvent. Thin films can be formed by spreading the solution between two plates and extracting the solvent by placing the plates in a bath of the non-solvent.

Hollow spheres and hollow tubes can also easily be produced by the solvent drying technique merely by incorporating a temperature-activated blowing agent into the polymer solution and then maintaining the bath of non-solvent at a temperature which triggers the gasification of the blowing agent. A suitable blowing agent is $NH_4HCO_3$ which, in the form of fine particles, can be uniformly dispersed throughout the polymer solution, preferably in an amount of about 1-3% by weight. Droplets of the solution falling into the non-solvent bath, if maintained at a temperature higher than the activation temperature of the blowing agent, form hollow spheres.

Suitable solvents for PAN include dimethylformamide (DMF), dimethylsulfoxide (DMSO) and dimethylacetamide (DMAc). DMF is the preferred solvent and solutions of suitable viscosity can be made by dissolving a sufficient amount of PAN in DMF to give a solution containing 5-20% by weight, more preferably 8-16% by weight, and most preferably 12-15% by weight of PAN.

When cellulose or a cellulose derivative (e.g. the textile material sold under the trademark RAYON) is used as the polymer, a mixture of about 10% by weight of LiCl in DMF may be used as a solvent It is known that the LiCl acts as a solubilizing aid which increase the solubility of cellulose in DMF. When polyvinylalcohol is used as the polymer, DMF is a suitable solvent. Suitable solvents are also available for the other polymers mentioned above.

When PAN is used as the polymer and DMF is used as the solvent, the non-solvent may be water or methanol. Suitability as a non-solvent for the PAN/DMF system appears to be associated with a high polarity and the presence of —OH groups. Acetone, for example, is not suitable as a non-solvent for the PAN/DMF system because the coagulation or precipitation of the polymer is not sufficiently rapid.

Since water is inexpensive, it is the preferred non-solvent, but 0-80% by weight of the solvent (DMF) may be included in the water.

When the polymer is cellulose or a derivative thereof in a DMF solution containing 10% LiCl, the non-solvent may be water.

For polyvinyl alcohol in DMF methyl ethyl ketone can be used as a non-solvent.

Once the polymer/oxide dispersion has been obtained (and, if necessary, stabilized) it is heated to carbonizing temperatures (e.g. 500°-750° C.) in a non-oxidizing atmosphere to convert the polymer to carbon. The resulting product comprises oxide particles surrounded by a carbon matrix.

Heating of the oxide/carbon product in a non-oxidizing atmosphere containing nitrogen then results in the conversion of some of the oxide to the corresponding nitride as indicated above and sintering of the remaining oxide particles. The temperature required to bring about the reaction depends on the identity of the oxide starting material; however, the usual temperature range is about 1200° C. -2000° C. When alumina is the starting material, the effective temperature range is 1600°-1900° C. and more preferably 1600°-1850° C. For titania, the usual reaction temperature is 1400° to 1500° C. Heating for several hours is generally required.

The non-oxidizing atmosphere used for the heating step should contain nitrogen or a nitrogen precursor which forms nitrogen at the reaction temperature (e.g. $NH_3$ or an amine). If desired, the atmosphere may consist solely of nitrogen or a mixture of nitrogen with another non-oxidizing gas, e.g. a noble gas such as argon, may be employed. In the latter case, there is a minimum concentration of nitrogen below which some of the oxide is converted by the carbon to a volatile sub-oxide which is driven off, thus making the product porous. The minimum concentration varies according to the identity of the oxide, the amount of oxide and carbon etc., and can readily be established, if desired, by trial and experimentation. In general, sufficient nitrogen should be present to assure the conversion to the nitride of all of the oxide that reacts with the carbon.

The product of the heating step is a sintered ceramic body containing both the starting oxide and the corresponding nitride with very little or no free carbon. The ratio of oxide to nitride depends on the oxide to carbon ratio of the intermediate product subjected to the heating step.

Incidentally, combinations of different oxides can be used as the starting materials to give products containing more than one oxide and nitride. Moreover, the carbonization step and the nitride-forming step can be carried out as distinct parts of a single step by placing the polymer/oxide dispersion in a suitable reactor having a suitable atmosphere and raising the temperature through the carbonization range to the nitride-forming range.

The shaped products of the invention have a variety of uses, e.g. as high temperature insulation, catalyst supports, shock absorbers in vibrational environments, and for the manufacture of low density syntactic bodies with high temperature strength, etc.

The invention is illustrated in further detail by the following Example.

EXAMPLE

A solution of PAN in DMF (concentration 12% by weight) was prepared and ground alumina prepared by the Bayer process (having a particle size of less than 1 micron) was dispersed in it with an $Al_2O_3$:PAN ratio of 5:1. Powdered $NH_4HCO_3$ (about 2% by weight of the solution) was added and uniformly dispersed.

The resulting dispersion was divided into droplets which were allowed to fall into a bath of a DMF/water mixture (40% DMF, 60% water by volume) maintained at 50°–60° C. The droplets each formed hollow spheres of PAN containing dispersed $Al_2O_3$ spheres.

The hollow spheres were removed from the bath and heated at 210° C. for 16 hours in order to stabilize the PAN. The stabilized spheres were then heated slowly in an $N_2$ atmosphere over 5 hours up to a temperature of 1920° C. and maintained at this temperature for 3 hours.

After cooling, the product was extracted from the reactor and was found to consist of hollow ceramic spheres. No trace of carbon was evident and XRD analysis showed the presence of both $Al_2O_3$ and AlN. Analysis of the spheres by KEVEX detected Al as the metallic element.

What we claim is:

1. A process for producing shaped refractory products made of metal oxide particles bonded together, which comprises:

dispersing particles of an oxide selected from the group consisting of silica, other metal oxides and mixtures thereof in a water-insoluble organic polymer to form a dispersion, shaping the dispersion into a desired shape, heating the shaped dispersion in a non-oxidizing atmosphere to carbonize the polymer to form a carbonized product, and heating the carbonized product at a nitride-forming temperature in a non-oxidizing atmosphere containing nitrogen, wherein the ration of the oxide to the carbon formed from the polymer upon carbonization is chosen so that some of the oxide is converted to metal nitride but a majority of said oxide remains unconverted.

2. A process according to claim 1 wherein said desired shape has a maximum thickness of about 5 mm.

3. A process according to claim 1 wherein the oxide particles have an average size of less than about $5\mu$.

4. A process according to claim 1 wherein the oxide is an oxide of a metal selected from Groups 3 and 4 of the Periodic Table.

5. A process according to claim 1, wherein the oxide is selected from the group consisting of silica, alumina, zirconia, titania, and tungsten oxide.

6. A process according to claim 1, wherein the polymer is selected from the group consisting of polyacrylonitrile and its copolymers and terpolymers, cellulose and its derivatives, cellulose and its derivatives, polyarylether, polyacenaphthylene and polyacetylene.

7. A process according to claim 1, wherein the polymer is selected from the group consisting of polyacrylonitrile and its copolymer and terpolymers.

8. A process according to claim 7 wherein said polymer is stabilized by being subjected to heating in air at a temperature of about 190° to 220° C. for up to about 16 hours before being subjected to the carbonizing step.

9. A process according to claim 1, wherein the dispersion is formed by melting the polymer, adding the oxide particles to the melt and thoroughly mixing the particles with the polymer.

10. A process according to claim 1, wherein the dispersion is formed by dissolving the polymer in a suitable solvent to form a resulting solution, mixing the oxide particles with the resulting solution to form a uniform mixture and then removing the solvent by evaporation.

11. A process according to claim 1, wherein the dispersion is formed by dissolving the polymer in a suitable solvent, mixing the oxide particles with the resulting solution to form a uniform mixture, and then contacting the mixture with a liquid which is a non-solvent for the polymer but which is miscible with the solvent.

12. A process according to claim 11 wherein a heat sensitive solid particulate blowing agent is added to said mixture and uniformly dispersed therein, and wherein said liquid which is a non-solvent for said polymer is maintained at a temperature high enough to cause said blowing agent to decompose in order to shape said dispersion of oxide particles in said polymer into a hollow shape.

13. A process according to claim 12 wherein droplets of said mixture are immersed in said liquid to shape said dispersion into hollow spheres.

14. Sintered hollow spheres made of a refractory oxide containing a proportion of the corresponding nitride, whenever prepared by the process of claim 13.

* * * * *